US012659056B2

(12) United States Patent
Feng et al.

(10) Patent No.: US 12,659,056 B2
(45) Date of Patent: Jun. 16, 2026

(54) METHODS AND WIRELESS DEVICES FOR ESTIMATING ANTENNA CALIBRATION ERROR IN A WIRELESS COMMUNICATION NETWORK

(71) Applicant: Telefonaktiebolaget LM Ericsson (publ), Stockholm (SE)

(72) Inventors: Ang Feng, Solna (SE); Christian Braun, Vallentuna (SE); Hao Zhang, Guangzhou (CN); Georgy Levin, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/844,522

(22) PCT Filed: Mar. 7, 2022

(86) PCT No.: PCT/CN2022/079599
§ 371 (c)(1),
(2) Date: Sep. 6, 2024

(87) PCT Pub. No.: WO2023/168569
PCT Pub. Date: Sep. 14, 2023

(65) Prior Publication Data
US 2025/0211342 A1 Jun. 26, 2025

(51) Int. Cl.
*H04B 17/21* (2015.01)
*H04B 7/0413* (2017.01)
*H04L 5/00* (2006.01)

(52) U.S. Cl.
CPC ........... *H04B 17/21* (2015.01); *H04B 7/0413* (2013.01); *H04L 5/0048* (2013.01)

(58) Field of Classification Search
CPC ...... H04B 17/21; H04B 7/0413; H04L 5/0048
See application file for complete search history.

(56) References Cited

U.S. PATENT DOCUMENTS 11,668,740 B2 * 6/2023 Grossmann ............ H04B 17/12
324/615
2011/0254736 A1 * 10/2011 Thomas ................ H04B 17/10
342/417
(Continued)

FOREIGN PATENT DOCUMENTS

WO 2016/122387 A1 8/2016
WO 2020/093209 A1 5/2020
(Continued)

*Primary Examiner* — Freshteh N Aghdam
(74) *Attorney, Agent, or Firm* — FBT Gibbons LLP

(57) ABSTRACT

Disclosed is a method performed by a receiver of a wireless communication network (100), for estimating antenna calibration error in the receiver based on one or more Reference Signals, RS, sent by one or more transmitters of the wireless communication network. The receiver comprises a plurality of radio antennas arranged in a known geometrical configuration. The method comprises obtaining (302) channel data of a communication channel between the transmitter and the receiver based on the one or more RS sent wirelessly between the transmitter and the plurality of antennas of the receiver, the obtained (302) channel data comprising $H_{OTA}$ and $H_{RX}$. $H_{OTA}$ being the channel data contributed by a wireless propagation path between the transmitter and the receiver, $H_{RX}$ being the channel data contributed by the antenna calibration error of the receiver. The method further comprises determining (306) a direction between the transmitter and the receiver in relation to the known geometrical configuration arrangement of the plurality of radio antennas, based on the obtained (302) channel data, the determined (306) direction indicating the $H_{OTA}$. The method further comprises mitigating (308) the $H_{OTA}$ from the obtained (302) channel data based on the determined (306) direction. The method further comprises providing (310) the $H_{RX}$ part of the obtained (302) channel data after the $H_{OTA}$ being
(Continued)

mitigated (308), the $H_{RX}$ indicating the antenna calibration error in the form of channel data.

13 Claims, 11 Drawing Sheets

(56) References Cited

U.S. PATENT DOCUMENTS

| | | | |
|---|---|---|---|
| 2015/0381247 A1* | 12/2015 | Ko | H04B 7/0469 |
| | | | 370/329 |
| 2022/0278448 A1* | 9/2022 | Tsui | H04W 52/267 |
| 2023/0308312 A1* | 9/2023 | Asplund | H04B 17/12 |
| 2024/0048200 A1* | 2/2024 | Tawa | H04B 7/06 |

FOREIGN PATENT DOCUMENTS

| | | | |
|---|---|---|---|
| WO | 2020/256607 A1 | 12/2020 | |
| WO | 2022/010389 A1 | 1/2022 | |

* cited by examiner

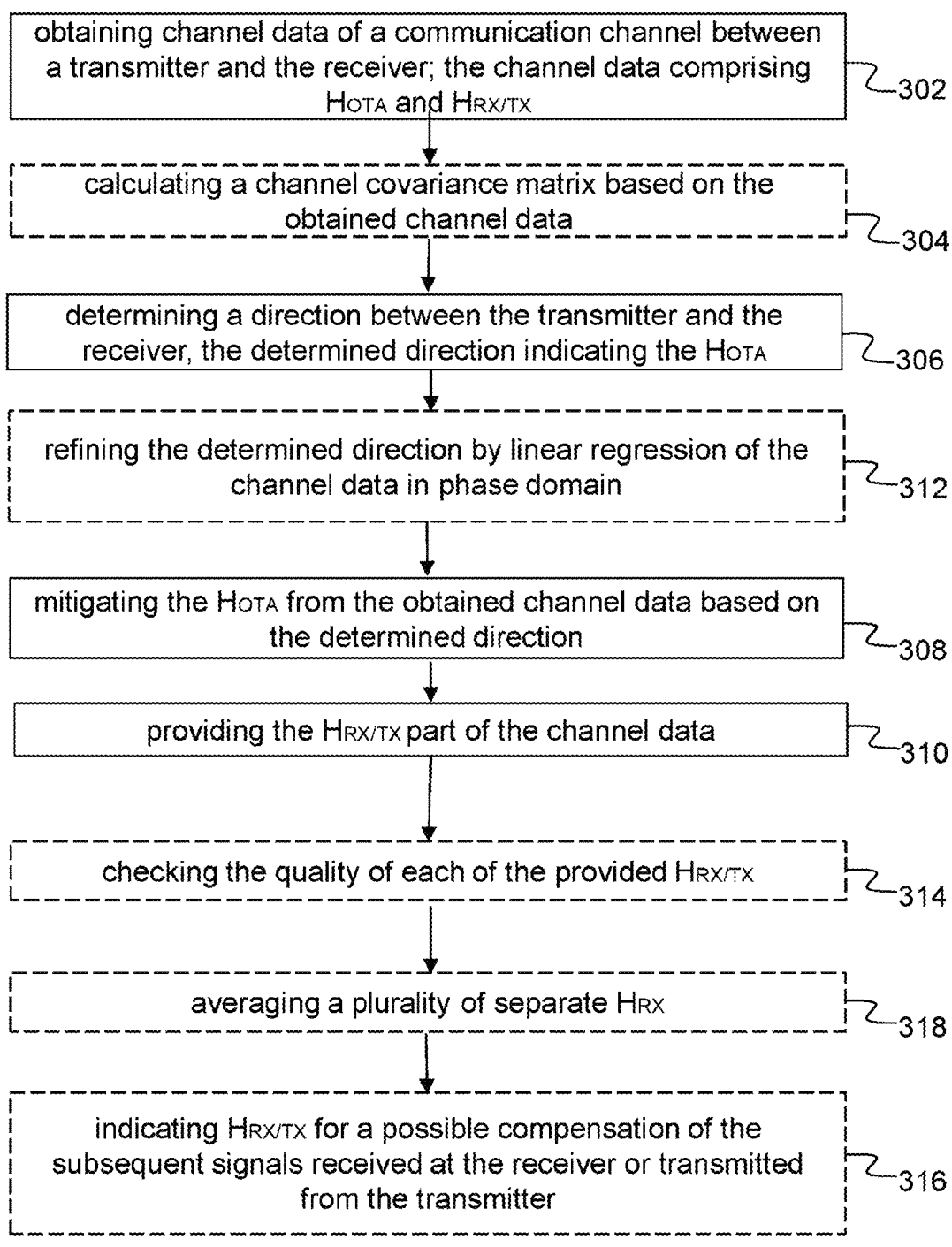

obtaining channel data of a communication channel between a transmitter and the receiver; the channel data comprising $H_{OTA}$ and $H_{RX/TX}$ — 302 calculating a channel covariance matrix based on the obtained channel data — 304 determining a direction between the transmitter and the receiver, the determined direction indicating the $H_{OTA}$ — 306 refining the determined direction by linear regression of the channel data in phase domain — 312 mitigating the $H_{OTA}$ from the obtained channel data based on the determined direction — 308 providing the $H_{RX/TX}$ part of the channel data — 310 checking the quality of each of the provided $H_{RX/TX}$ — 314 averaging a plurality of separate $H_{RX}$ — 318 indicating $H_{RX/TX}$ for a possible compensation of the subsequent signals received at the receiver or transmitted from the transmitter — 316

METHODS AND WIRELESS DEVICES FOR ESTIMATING ANTENNA CALIBRATION ERROR IN A WIRELESS COMMUNICATION NETWORK

This application is a national-phase entry under 35 USC § 371 of International Application No. PCT/CN2022/079599, filed Mar. 7, 2022, titled "Methods and Wireless Devices for Estimating Antenna Calibration Error in a Wireless Communication Network," the contents of which are hereby incorporated herein in its entirety.

TECHNICAL FIELD

The present disclosure relates generally to methods and wireless devices for estimating antenna calibration error in a wireless communication network. The present disclosure also relates to computer programs and carriers corresponding to the above methods and devices.

BACKGROUND

To meet the huge demand for higher bandwidth, higher data rates and higher network capacity, due to e.g. data centric applications, existing $4^{th}$ Generation (4G) wireless communication network technology, aka Long Term Evolution (LTE) is being extended or enhanced into a $5^{th}$ Generation (5G) technology, also called New Radio (NR) access. The following are requirements for 5G wireless communication networks:

Data rates of several tens of megabits per second should be supported for tens of thousands of users;

Up to 1 gigabit per second is to be offered simultaneously to tens of users working at proximity area;

Several hundreds of thousands of simultaneous connections are to be supported for deployment of massive sensors;

Spectral efficiency should be significantly enhanced compared to 4G;

Coverage should be improved compared to 4G;

Signaling efficiency should be enhanced compared to 4G; and

Latency should be reduced significantly compared to 4G.

Massive Multiple-Input Multiple-Output (MIMO) has been recognized as the key enabler of 5G systems. Active Antenna System (AAS) is the implementation of Massive MIMO that integrates Radio Frequency (RF) transceivers and antennas together to achieve better performance within compact size. The performance gain of AAS stemming from the improved directivity of radiation, aka beamforming, can strengthen the received power at the receiver side. To enable beamforming, multiple antennas as well as their connected RF components should be aligned coherently. However, there is impairment between multiple antennas, e.g., the impairment might be caused by unsynchronized phase-locked loop (PLL) among transceivers, or different delays introduced in such as layout of RF board, filter units, isolators and antennas, etc. In order to compensate such impairment, antenna calibration (AC) is used. AC is a typical method to compensate the impairment of above-mentioned radio hardware. AC is a software function that can estimate and compensate the hardware imperfections, in which Reference Signal (RS) is transmitted and received via additional coupler network (CN), or Mutual Coupling (MC) between antennas. Ideally, proper hardware design as well as AC function can realize coherent transmitting/receiving of multiple antennas, thereby guaranteeing beamforming working as expected.

Currently the above-mentioned AC solutions include two major AC solutions presented in AAS products—CN AC and MC AC. However, some issues have been found in these AC solutions.

Firstly, local calibration signals are needed to acquire the response of RF transceivers and antennas. The calibration signals have to be transmitted or received at a traffic time slot, which may interrupt the traffic data. Secondly, for CN AC, dedicated hardware is needed, which increases the product cost. The MC AC can work without the CN, but it is sensible to the coupling levels between subarrays. In addition, MC AC only works in Time Division Duplex (TDD) but not in Frequency Division Duplex (FDD) because it requires the same frequency in TX and RX directions. Thirdly, both CN and MC AC solutions need additional characterization in production to correct the deviation of compensation, such as pre-measurement of S-parameters of CN or S-Matrix of MC. That increases production time and cost. Fourthly, AC suffers from hardware or software failures from inside, or interference from outside. So far, it is hard to evaluate the AC performance in the field. That may cause unnecessary product returns or undetectable faults.

In order to solve the issues above, two improved prior art AC methods are provided. The first improved AC method is AC with RS from UE. This method can work in the field to evaluate the correctness or improve the accuracy of existing AC function. However, it has two problems. Firstly, it does not handle the issue with Direction-of-Arrival (DOA) effects from the UE. Hence it leaves a pointing-like error which might change the coverage area of a cell to a hotspot, i.e., not aligned with boresight of the AAS. Secondly, only uniform linear array (ULA) is considered. However, current AAS products are all deployed with uniform rectangular array (URA) to enable full-dimension beamforming.

The second improved AC method is AC with assistance of UE for relaxed phase MIMO channels. However, it also has two problems. Firstly, a least square (LS) based linear regression is presented to estimate the phase error. However, it does not work well if the initial error is large, because processing in phase domain is compromised by phase wrap-around issues. Secondly, it has been investigated to utilize the feedback from multiple UEs to improve the accuracy. However, direct combination of multiple channel state information (CSI) doesn't work well. The performance gain can only be given by combining multiple CSI in a coherent manner. That needs extra processing to align all CSI before combination.

In general, the AC methods in prior art are not accurate enough. There is a deviation between the impairment compensated by AC and the actual impairment. For this reason, the deviation between the impairment compensated by AC and the actual impairment needs to be estimated and compensated. Such deviation is called AC error in this application.

Thus, there is a need to provide a method for estimating the AC error in an efficient, accurate, and economical way.

SUMMARY

It is an object of the invention to address at least some of the problems and issues outlined above. It is an object of embodiments of the invention to estimate AC error in an efficient, accurate and cost-efficient way. It is another object of embodiments to provide an accurate estimation of AC error in order to more accurately receive and transmit wireless signals between a transmitter and a receiver in wireless communication network. It is possible to achieve these objects and others by using methods, receivers and transmitters as defined in the attached independent claims.

According to one aspect, a method performed by a receiver of a wireless communication network, for estimating antenna calibration error in the receiver is provided. The receiver comprising a plurality of radio antennas arranged in a known geometrical configuration. The method comprises obtaining channel data of a communication channel between the transmitter and the receiver based on one or more Reference Signals, RS, sent wirelessly between the transmitter and the plurality of antennas of the receiver, the obtained channel data comprising $H_{OTA}$ and $H_{RX}$, $H_{OTA}$ being the channel data contributed by a wireless propagation path between the transmitter and the receiver, $H_{RX}$ being the channel data contributed by the antenna calibration error of the receiver. The method further comprises determining a direction between the transmitter and the receiver in relation to the known geometrical configuration arrangement of the plurality of radio antennas of the receiver, based on the obtained channel data, the determined direction indicating the $H_{OTA}$. The method further comprises mitigating the $H_{OTA}$ from the obtained channel data based on the determined direction and providing the $H_{RX}$ part of the obtained channel data after the $H_{OTA}$ being mitigated (308).

According to another aspect, a method performed by a transmitter of a wireless communication network for estimating antenna calibration error in the transmitter is provided. The transmitter comprising a plurality of radio antennas arranged in a known geometrical configuration. The method comprises obtaining channel data of a communication channel between the transmitter and a receiver based on the channel data feedback wirelessly by the receiver to the transmitter, the channel data feedback by the receiver being based on one or more Reference Signals, RS, sent from the transmitter to the receiver, the obtained channel data comprising $H_{OTA}$ and $H_{TX}$, $H_{OTA}$ being the channel data contributed by a wireless propagation path between the transmitter and the receiver, $H_{TX}$ being the channel data contributed by the antenna calibration error of the transmitter. The method further comprises determining a direction between the receiver and the transmitter in relation to the known geometrical configuration arrangement of the plurality of radio antennas of the transmitter, based on the obtained channel data, the determined direction indicating $H_{OTA}$. The method further comprises mitigating the $H_{OTA}$ from the obtained channel data by the determined direction and providing the $H_{TX}$ part of the obtained channel data after the $H_{OTA}$ being mitigated.

According to another aspect, a receiver operable in a wireless communication network and configured for estimating antenna calibration error in the receiver is provided. The receiver comprising a plurality of radio antennas arranged in a known geometrical configuration, the receiver comprising a processing circuitry and a memory, said memory containing instructions executable by said processing circuitry. The receiver is operative for obtaining channel data of a communication channel between a transmitter and the receiver based on one or more Reference Signals, RS, sent wirelessly between the transmitter and the plurality of antennas of the receiver, the obtained channel data comprising $H_{OTA}$ and $H_{RX}$, $H_{OTA}$ being the channel data contributed by a wireless propagation path between the transmitter and the receiver, $H_{RX}$ being the channel data contributed by the antenna calibration error of the receiver. The receiver is further operative for determining a direction between the transmitter and the receiver in relation to the known geometrical configuration arrangement of the plurality of radio antennas of the receiver, based on the obtained channel data, the determined direction indicating the $H_{OTA}$. The receiver is further operative for mitigating the $H_{OTA}$ from the obtained channel data based on the determined direction and providing the $H_{RS}$ part of the obtained channel data after the $H_{OTA}$ being mitigated.

According to another aspect, a transmitter operable in a wireless communication network and configured for estimating antenna calibration error in the transmitter is provided. The transmitter comprising a plurality of radio antennas arranged in a known geometrical configuration, the transmitter comprising a processing circuitry and a memory, said memory containing instructions executable by said processing circuitry. The transmitter is operative for obtaining channel data of a communication channel between the transmitter and a receiver based on the channel data feedback wirelessly by the receiver to the transmitter, the channel data feedback by the receiver being based on one or more Reference Signals, RS, sent from the transmitter to the receiver, the obtained channel data comprising $H_{OTA}$ and $H_{TX}$, $H_{OTA}$ being the channel data contributed by a wireless propagation path between the transmitter and the receiver, $H_{TS}$ being the channel data contributed by the antenna calibration error of the transmitter. The transmitter is further operative for determining a direction between the receiver and the transmitter in relation to the known geometrical configuration arrangement of the plurality of radio antennas of the transmitter, based on the obtained channel data, the determined direction indicating $H_{OTA}$. The transmitter is further operative for mitigating the $H_{OTA}$ from the obtained channel data by the determined direction and providing the $H_{TS}$ part of the obtained channel data after the $H_{OTA}$ being mitigated.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 3 is a flow chart illustrating a method performed by a receiver or a transmitter, according to possible embodiments.

FIG. 12 is an x/y-diagram illustrating the point error in CDL-E channels, using MUSIC and LS algorithm.

DETAILED DESCRIPTION

Figure 1:
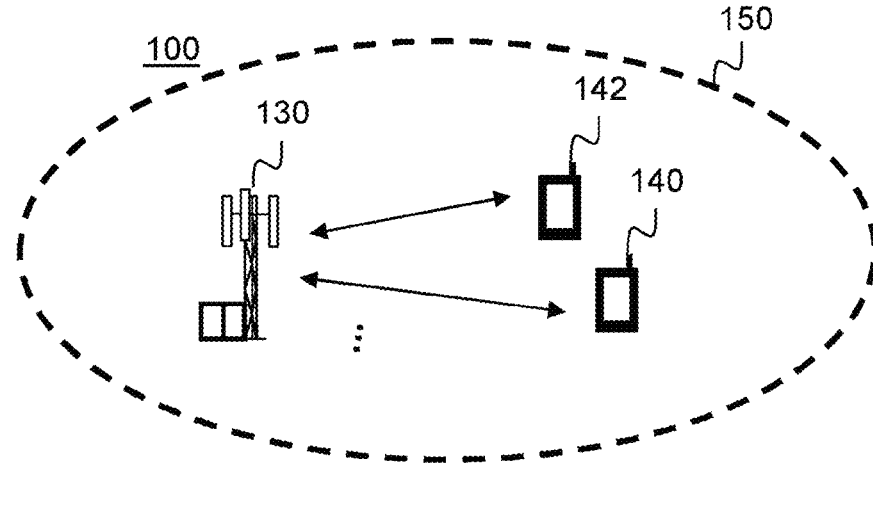
FIG. 1 is a schematic block diagram of a wireless communication network in which the embodiments of the present invention may be used.

FIG. 1 shows a wireless communication network 100 comprising a network node 130 that is in, or is adapted for, wireless communication with a number of wireless devices 140, 142. The network node 130 provides radio coverage in a cell 150, which is a geographical area. The number of wireless devices 140, 142 resides in the cell 150.

The wireless communication network 100 may be any kind of wireless communication network that can provide radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE) Frequency Division Duplex (FDD) and Time Division Duplex (TDD), LTE Advanced, Wireless Local Area Networks (WLAN), Worldwide Interoperability for Microwave Access (WiMAX), WIMAX Advanced, as well as 5G wireless communication networks based on technology such as New Radio (NR). However, the embodiments of the following detailed description are described for NR.

The network node 130 may be any kind of network node that provides wireless access to the number of wireless devices 140, 142 alone or in combination with another network node. The network node 130 may also be called radio network node in this disclosure. Examples of RAN nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH), nodes in a distributed antenna system (DAS) and a multi-standard radio BS (MSR BS).

The number of wireless devices 140, 142 may be any type of device capable of wirelessly communicating with a radio access network node 130 using radio signals. The number of wireless devices may also be called wireless communication device or simply device in this disclosure. For example, the number of wireless devices 140, 142 may be a UE, a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

The embodiments described may be applicable to single carrier as well as to multicarrier (MC) or carrier aggregation (CA) operation of the number of wireless devices. The term CA may also be called multi-carrier system, multi-cell operation, multi-carrier operation, and multi-carrier transmission and/or reception. The embodiments may equally apply for multi radio bearers (RAB) on some carriers, which means that data and speech are simultaneously scheduled. In the following, each wireless device is called a UE.

Figure 2:
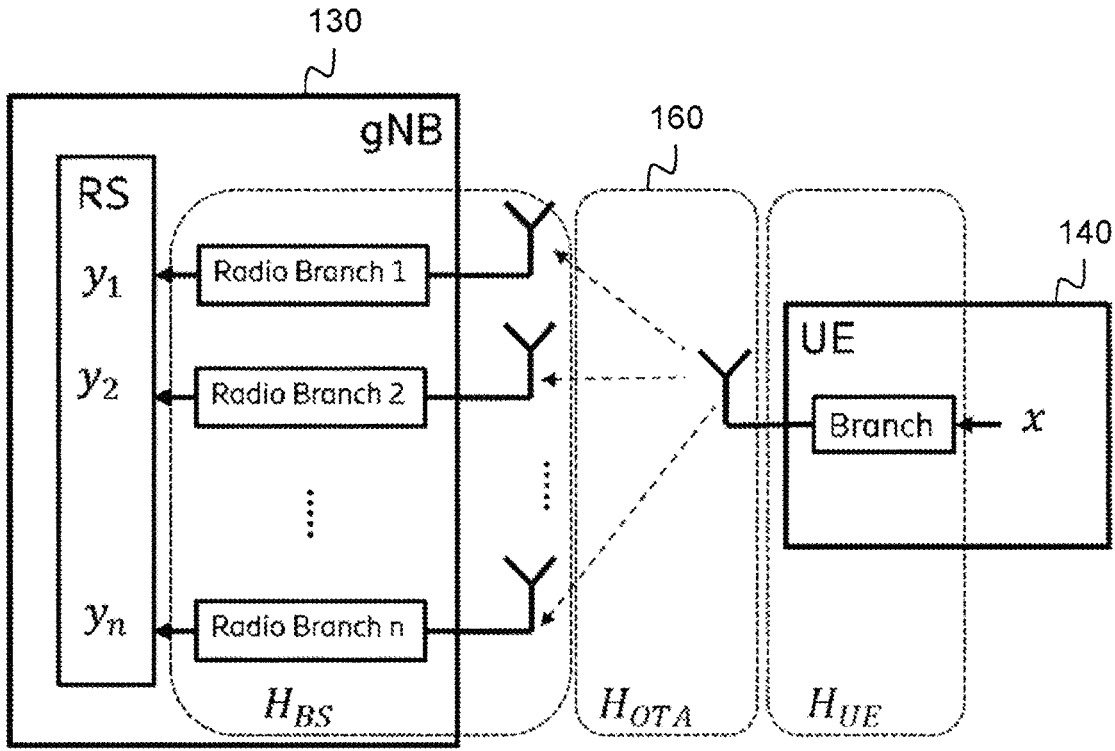
FIG. 2 is a schematic block diagram of a user equipment (UE), a wireless channel and a network node.

FIG. 2 describes a UE 140, a wireless propagation path 160 and a network node 130 in an embodiment of this invention. In this example, RS is transmitted from the UE 140 to the network node 130. The network node 130 is exemplified as a gNB 130 in FIG. 2. As shown in FIG. 2, a radio channel consists of three parts: the UE part 140, the wireless propagation path 160, and the gNB part 130. Channel data is an estimation of characteristics of the communication channel between the transmitter and the receiver and can be used to denote the radio channel. Channel data is determined by comparing the local reference signals with the received reference signals at the receiver side. The reference signals are known at both the transmitter and the receiver. In same examples, the channel data is also called as channel state information, CSI. The channel data includes three parts: $H_{UE}$, $H_{BS}$ and $H_{OTA}$. $H_{UE}$ represents channel data describing the impairment of radio hardware of the UE 140. $H_{BS}$ represents channel data describing the impairment of radio hardware of the gNB 130. $H_{OTA}$ represents channel data describing the wireless channel over the air (OTA) in the wireless propagation path 160. In total, $H_{BS}$, $H_{UE}$ and $H_{OTA}$ are lumped together and entitled as the channel data. $H_{BS}$ and $H_{UE}$ are commonly ignored in beamforming because the impairment of radio hardware assumed to already be compensated by the equipment vendor. However, this is not true in practice. In Massive MIMO systems, the impairment of radio hardware, aka AC error in this application, e.g., non-coherency between multiple antennas at the gNB 130 may deteriorate the performance of beamforming.

One object of embodiments of this invention is to calculate the $H_{BS}$ based on reference signals, thus the impact due to AC error of gNB 130 can be reduced and compensated in wireless signal reception.

FIG. 3 describes a method performed by a receiver of a wireless communication network 100 for estimating AC error in the receiver. The receiver comprising a plurality of radio antennas arranged in a known geometrical configuration. The method comprises obtaining 302 channel data of a communication channel between the transmitter and the receiver based on one or more reference signals, RS, sent wirelessly between the transmitter and the plurality of antennas of the receiver. The obtained 302 channel data comprises $H_{OTA}$ and $H_{RX}$. $H_{OTA}$ is the channel data contributed by a wireless propagation path between the transmitter and the receiver and $H_{RX}$ is the channel data contributed by the AC error of the receiver. The method further comprises determining 306 a direction between the transmitter and the receiver in relation to the known geometrical configuration arrangement of the plurality of radio antennas of the receiver, based on the obtained 302 channel data. The determined 306 direction indicates the $H_{OTA}$. The method further comprises mitigating 308 $H_{OTA}$ from the obtained 302 channel data based on the determined 306 direction and providing 310 the $H_{RX}$ part of the obtained 302 channel data after the $H_{OTA}$ being mitigated 308.

Referring to FIG. 1, the receiver in this method can be the network node 130 or the UE 140, 142. When the receiver is the network node 130, the transmitter can be one or more UEs 140, 142. When the receiver is the UE 140, the transmitter is the network node 130. The plurality of radio antennas of the receiver is arranged in a known geometrical configuration, e.g., uniform linear array, ULA or uniform rectangular array, URA. The channel data is obtained from the RS received by the receiver. The channel data comprises at least two parts $H_{OTA}$ and $H_{RX}$. The channel data may also include $H_{TX}$, which is the channel data contributed by the transmitter, but is neglected here because its impact is common for all radio antennas in the receiver. This will be explained in detail below.

Referring to FIG. 2 and FIG. 3, the $H_{OTA}$ in FIG. 3 corresponds to the $H_{OTA}$ in FIG. 2, and the $H_{RX}$ in FIG. 3 corresponds to the $H_{BS}$ in FIG. 2, both indicating the AC error of the receiver. An $H_{TX}$ corresponds to the $H_{UE}$ in the FIG. 2, which indicates the AC error of the transmitter. In other words, FIG. 2 is a special case of FIG. 3 when the receiver is a network node in the form of gNB 130, and the transmitter is the UE 140.

For an Orthogonal Frequency Division Multiplexing (OFDM) based system, the channel data can be expressed as H(k,i,n), where k, i, n denote subcarrier, OFDM symbol, and receiver antenna branch, respectively. Accordingly, the channel data can be rewritten as:

$$H(k,i,n)=H_{RX}(k,i,n)H_{OTA}(k,i,n)H_{TX}(k,i,1)$$

Without loss of generality, it is assumed that one antenna branch at the UE side, so the $H_{TX}$ (k, i, 1) is common for all received signals at the receiver side. The channel data can be simplified as:

$$H_r(k,i,n)=H_{RX}(k,i,n)H_{OTA}(k,i,n)$$

The equation above indicates the step 302, that the channel data $H_r$ comprises $H_{OTA}$ and $H_{RX}$, $H_{OTA}$ being the channel data contributed by a wireless propagation path between the transmitter and the receiver and $H_{RX}$ being the channel data contributed by the AC error of the receiver. The channel data $H_r$ is determined by comparing the local RS and the received RS at the receiver side. Since the channel data is known, in order to estimate AC error $H_{RX}$, the $H_{OTA}$ needs to be calculated and mitigated from the known channel data $H_r$.

The $H_{OTA}$ is affected by the impairment of general direction-of-arrival (DOA) in relation to the arrangement of the antennas. The DOA indicates how much the transmitter is off boresight for an otherwise unknown transmitter position. Taking a rectangular antenna array as example, the boresight is the perpendicular line with respect to the rectangular antenna array. When the transmitter is in boresight, the DOA is zero. When the transmitter is off boresight and the DOA differs from zero, the wireless signal arrives at the receiver antennas with different delays and creates a phase ramp across the antenna array. This phase ramp may be quite large depending on the angle of income signal, as well as the dimensions of the antenna array.

In step 306, the direction between the transmitter and the receiver in relation to the radio antennas of the receiver is determined. This determined direction is the DOA. The determination is based on the obtained channel data $H_r$. As explained in the previous paragraph, the $H_{OTA}$ is affected by the DOA, aka the determined direction, hence the $H_{OTA}$ is indicated by the determined direction in step 306.

Figure 4:
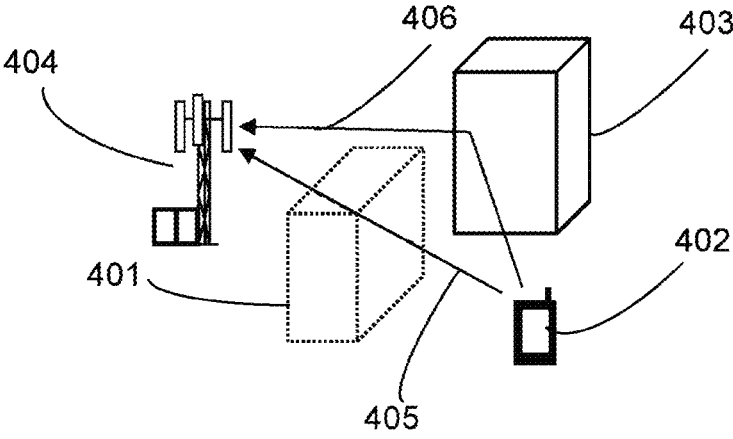
FIG. 4 is a schematic block diagram of a Line of Sight (LOS) and non-Line of sight (NLOS).

According to some embodiments, referring to FIG. 4, the determined direction in step 306, which is a direction between transmitter 402 and receiver 404, is not always equal to a LOS direction 405. If the LOS direction 405 is obscured by a building 401 or other object, the direction between transmitter 402 and receiver 404 is decided by a reflected signal 406 from another building 403 or other object. In the following it shall be understood that the direction determined in step 306, which is between transmitter 402 and receiver 404, shall be understood as: the direction of maximum channel response, no matter the signal is from a LOS path or a reflected, aka NLOS path.

Once the $H_{OTA}$ is determined in step 306, the $H_{OTA}$ is mitigated 308 from the channel data. After mitigation 308, only the $H_{RX}$ remains. The $H_{RX}$ is the estimated AC error of the receiver.

By such a method, the effect of the $H_{OTA}$ is mitigated from the channel data and AC error of the receiver is obtained.

According to another embodiment, the method further comprises calculating 304 a channel covariance matrix based on the obtained channel data. The step of determining 306 a direction between the transmitter and the receiver further comprises determining 306 the direction, based on the calculated 304 channel covariance matrix by using a subspace method on the channel covariance matrix, the determined direction having the maximum value in pseudo angular spectrum.

The whole estimation process in this embodiment, that is when the receiver is a network node 130 and the transmitter a UE 140, is explained in detail in following paragraphs.

If it is denoted that the transmitting signal as X(k, i), and the receiving signal as Y(k, i, n), the system can be expressed as $$Y(k, i, n) = H_r(k, i, n)X(k, i) + W(k, i, n)$$

where, W(k, i, n) is the received noise at subcarrier k, symbol i, antenna n. If X(k, i) is known, the channel data can be given by $$\tilde{H}_r(k, i, n) = Y(k, i, n)/X(k, i)$$

Furthermore, referring to explanations above, the channel data can be rewritten as $$\tilde{H}_r(k,i,n)=\tilde{H}_{RX}(k,i,n)\tilde{H}_{OTA}(k,i,n)$$

The $\tilde{H}_r(k, i, n)$ can be comparable to the obtained channel data in step 302. So far, channel data $\tilde{H}_r(k, i, n)$ is split into two parts, namely $\tilde{H}_{RX}(k, i, n)$ and $\hat{H}_{OTA}(k, i, n)$. Since the $\tilde{H}_r(k, i, n)$ is known, if the $\hat{H}_{OTA}$ (k, i, n) is determined so that the $\hat{H}_{RX}(k, i, n)$ can be estimated.

A channel covariance matrix in step 304 at subcarrier k and symbol i can be derived by $$C_r(k, i) = \begin{bmatrix} \tilde{H}_r(k, i, 1)\tilde{H}_r(k, i, 1)^* & \tilde{H}_r(k, i, 1)\tilde{H}_r(k, i, 2)^* & \dots & \tilde{H}_r(k, i, 1)\tilde{H}_r(k, i, N)^* \\ \tilde{H}_r(k, i, 2)\tilde{H}_r(k, i, 1)^* & \tilde{H}_r(k, i, 2)\tilde{H}_r(k, i, 2)^* & \dots & \tilde{H}_r(k, i, 2)\tilde{H}_r(k, i, N)^* \\ \vdots & \vdots & \ddots & \vdots \\ \tilde{H}_r(k, i, N)\tilde{H}_r(k, i, 1)^* & \tilde{H}_r(k, i, 0)\tilde{H}_r(k, i, 0)^* & \dots & \tilde{H}_r(k, i, N)\tilde{H}_r(k, i, N)^* \end{bmatrix}$$

Furthermore, $C_r(k, i)$ can be updated by averaging over all subcarriers in one subband, as well as all symbols in one slot. The slot is denoted as I, and the subband as K, the channel covariance matrix can be expressed as $$C_r(K, I) = \sum_{\substack{i \in slot\,I, \\ k \in subband\,K}} C_r(k, i)$$

A steering vector of transmitter is defined as $$a = [a(K,I,1)a(K,I,2) \dots a(K,I,N)]^T$$

The DOA of the transmitter is assumed to be constant in subband K and slot I. It makes sense because the number of subcarriers in one subband and the number of symbols in one slot can be configured according to the coherent frequency and coherent time respectively. For simplification, the index is ignored of K and I in the following expression.

For URA, supposing the antenna array is configured as $N = N_V \times N_H$, the steering vector can then be given by $$\tilde{a}_{AZ}(n_H) = \exp(i2\pi \cos(\phi_{EL})\sin(\phi_{AZ})d_H n_H)$$

$$\tilde{a}_{EL}(n_V) = \exp(i2\pi \sin(\phi_{EL})d_V n_V)$$

$$\tilde{a}(n_V, n_H) = \tilde{a}_{EL}(n_V)\tilde{a}_{AZ}(n_H)$$

$\phi_{EL}$ and $\phi_{AZ}$ denote the incident angles of UE at elevation and azimuth. $d_V$ and $d_H$ denote vertical and horizontal spacing between BS antennas. $n_V$ and $n_H$ denote the indices of BS antennas along vertical and horizontal coordinates.

The way of mapping the matrix index $(n_V, n_H)$ back to the vector index n is determined by the implementation proposal of radio products. Accordingly, the steering vector can be rewritten as $$a(\phi_{EL},\phi_{AZ}) = [\tilde{a}(1,1) \dots \tilde{a}(N_V,1)\, \tilde{a}(2,1) \dots \tilde{a}(N_V, N_H)]^T$$

On the other hand, the Singular Value Decomposition (SVD) of the channel covariance matrix $C_r$ is $$C_r = V\Sigma V^H$$

Define $V = [v_1 \dots v_m\, v_{m+1} \dots v_{m+s}]$, where $[v_1 \dots v_m]$ denotes the noise space which having smaller singular values, $[v_{m+1} \dots v_{m+S}]$ denotes the signal space which having larger singular values. S represents the dimension of signal space.

A subspace method is used to find out the optimal DOA which has the maximum value in the pseudo angular spectrum, i.e.

$$(\phi^*_{EL}, \phi^*_{AZ}) = \underset{(\phi_{EL},\phi_{AZ})}{\arg\max} \frac{1}{\sum_p |a(\phi_{EL}, \phi_{AZ})^H v_p|^2}$$

where $v_p$ is selected from the noise space $[v_1 \dots v_m]$. Angular spectrum describes the distribution of signal into angular components composing that signal. Pseudo angular spectrum denotes the angular spectrum calculated by a subspace method.

The optimal DOA can be comparable to the direction determined in step 306, that indicates the $H_{OTA}$. Subspace methods represent a category of methods that leverage the eigenvalues and eigenvectors of the signal to estimate the spectrum. Basically, the vector space is divided into two subspaces, i.e., signal subspace and noise subspace, and the spectrum is illustrated by the components projecting to either signal subspace or noise subspace. Typically, subspace method Multiple Signal Classification (MUSIC) is used in this embodiment. MUSIC is an algorithm used for spectral analysis and radio direction finding (RDF). Other subspace methods, such as Root-MUSIC, Estimation of Signal Parameters via Rotational Invariance Techniques (ESPRIT), etc., can be used as well. The Root-MUSIC method is a fast computation of classic MUSIC. It obtains the signal estimation by examining the roots of the spectrum polynomial. ESPRIT is another fast computation of classic MUSIC. It obtains the signal estimation by exploiting the underlying rotational invariance among signal subspaces.

Once the optimal DOA $(\phi^*_{EL}, \phi^*_{AZ})$ is obtained, the steering vector $a^*$ can be reproduced by above equations. Applying this vector to the received signal, the equation is obtained:

$$\tilde{\tilde{H}}_r(K,I,n) = a(K,I,n)^H \tilde{H}_r(K,I,n)$$

Apply the $a(K, I, n)^H$ to the channel data $\tilde{H}_r(K, I, n)$ can be comparable to the step 308, mitigating the $H_{OTA}$ from the channel data $\tilde{H}_r(K, I, n)$. The result $\tilde{\tilde{H}}_r(K, I, n)$ can be comparable to the $H_{RX}$ provided in step 310.

By such a method, it looks like that the transmitter is re-tilted from its original direction to the boresight. The effect of DOA is eliminated; therefore, the pointing-like error is removed and the $H_{RX}$ is provided.

Figure 5:
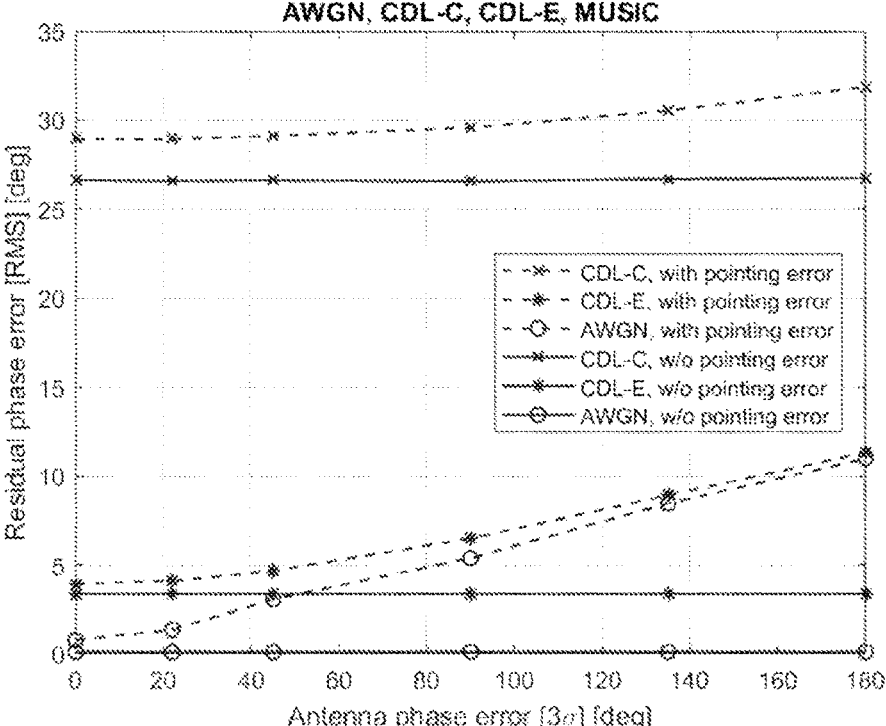
FIG. 5 is an x/y-diagram illustrating the resulting AC error in Additive white Gaussian noise (AWGN), Clustered Delay Line-C (CDL-C) and Clustered Delay Line-E (CDL-E) channels, using Multiple Signal Classification (MUSIC) algorithm.

FIG. 5 depicts the resulting residual AC error in AWGN, CDL-C and CDL-E channels. After mitigating in step 308, the phase offset due to the DOA of income signal is removed. However, a residual is remained. The residual is considered as the residual AC error. That is, the residual AC error is defined as the difference between the estimated AC error in above mentioned embodiment and the true AC error. As mentioned, the impact due to NLOS channels is also included in the residual AC error. In the figure, the results are plotted with pointing error and without point error. The pointing error denotes an estimation error in the resulting DOA. On the other hand, from the system performance perspective, the impact of pointing error is very different from the impact of residual AC error. The residual AC error looks like a random error, while the pointing error looks like a linear phase ramp. It is seen that CDL-C has the worse result compared to other channels. This is because the impact of NLOS in CDL-C is the strongest among them. CDL-E is better than CDL-C but worse than AWGN. Since there is no NLOS channels in AWGN, the residual AC error can approach to zero.

Figure 6:
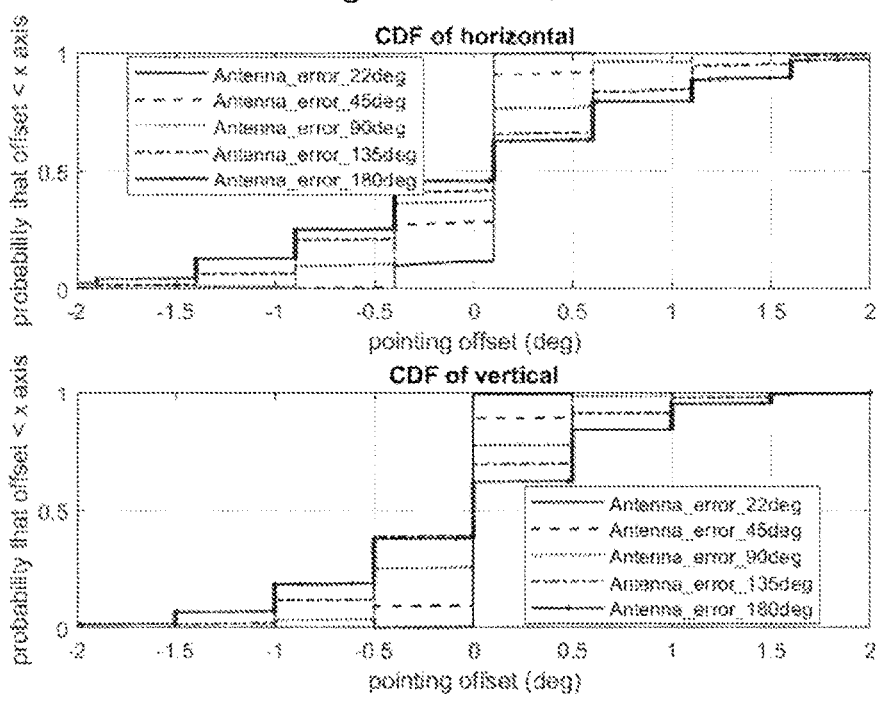
FIG. 6 is an x/y-diagram illustrating the pointing error in AWGN channels, using MUSIC algorithm.
Figure 7:
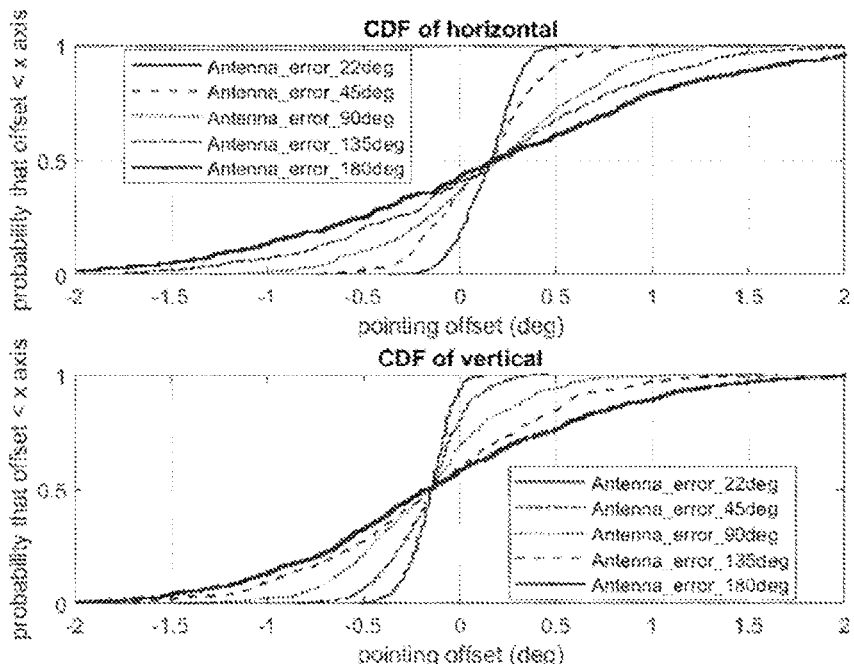
FIG. 7 is an x/y-diagram illustrating the pointing error in CDL-C channels, using MUSIC algorithm.
Figure 8:
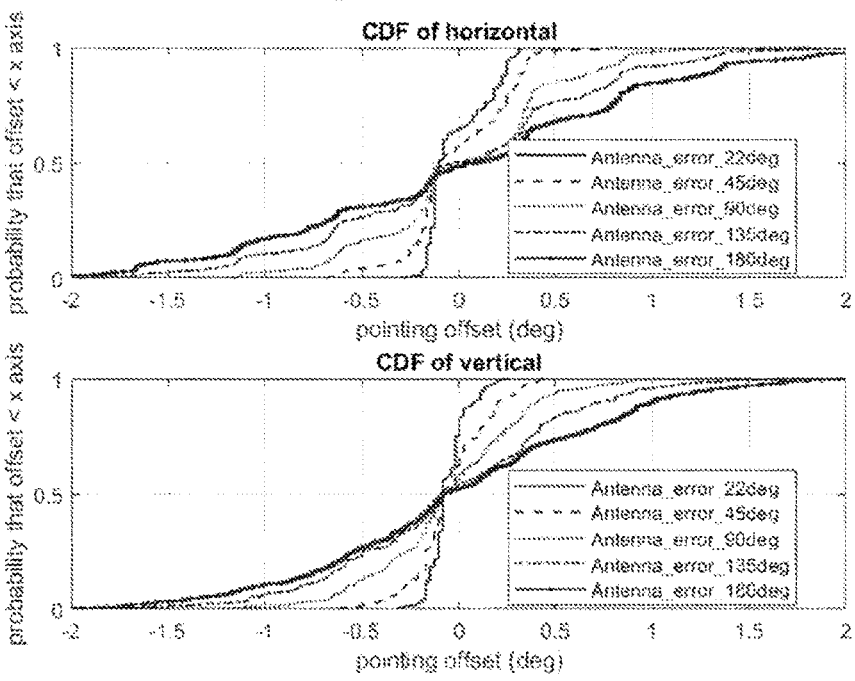
FIG. 8 is an x/y-diagram illustrating the pointing error in CDL-E channels, using MUSIC algorithm.

FIG. 6, FIG. 7 and FIG. 8 depict the pointing error in AWGN, CDL-C, and CDL-E channels, respectively. It is seen that as the initial AC error increases, the estimation error of resulting DOA also increases. Here, the initial AC error is defined as the initial state of AC error before the estimation in above-mentioned embodiment is applied. Noteworthily, even with large initial AC error, the pointing error can be constraint within ±2 degrees.

According to another embodiment, the method further comprises refining 312 the determined 306 direction at the receiver by linear regression of the obtained 302 channel data in phase domain.

In order to improve the accuracy of the provided 310 $H_{RX}$, a linear regression method can be applied to the provided 310 $H_{RX}$. Least squares method is a typical linear regression method. The LS method is a standard approach in regression analysis to figure out the parameters of an overdetermined system by minimizing the sum of the squares of the residual between the observed data from the measurement and the fitted data from the system.

By this method, the accuracy of the estimated AC error of the receiver is further improved.

Figure 9:
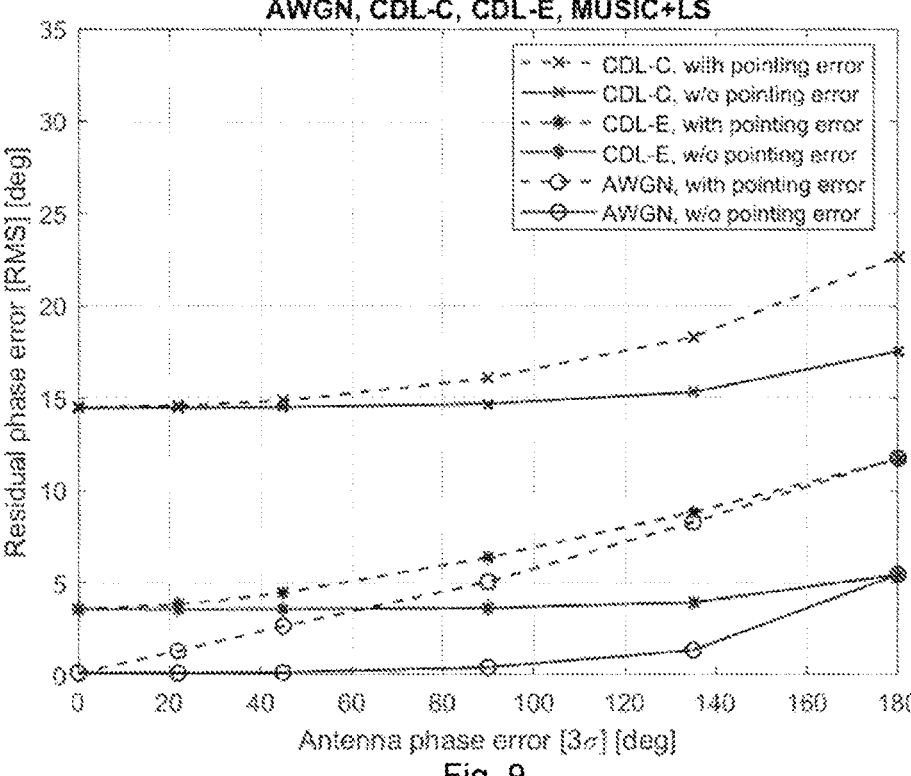
FIG. 9 is an x/y-diagram illustrating the resulting AC error in AWGN, CDL-C and CDL-E channels, using MUSIC and Least Squares (LS) algorithm.

FIG. 9 shows the residual AC error after the MUSIC plus LS method. Compared with FIG. 5, it is seen that MUSIC plus LS method outperforms MUSIC only in channels if the initial AC error is less than 90 degrees.

Figure 10:
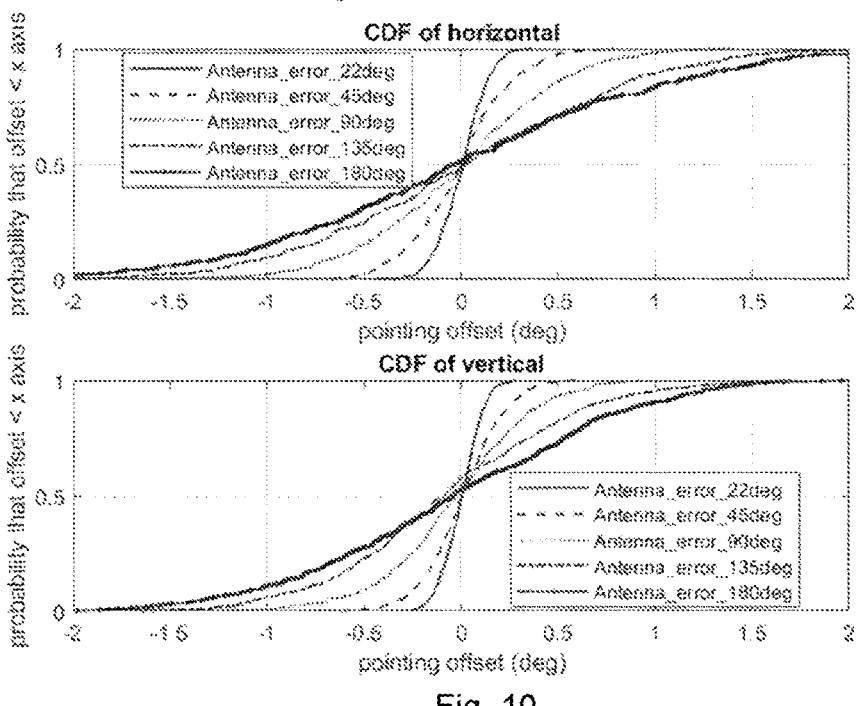
FIG. 10 is an x/y-diagram illustrating the point error in AWGN channels, using MUSIC and LS algorithm.
Figure 11:
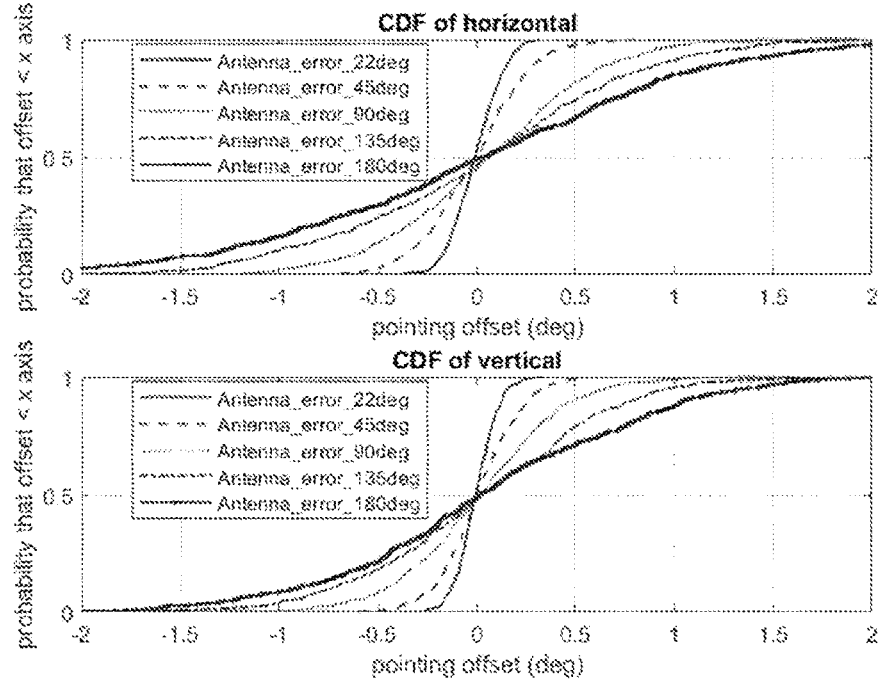
FIG. 11 is an x/y-diagram illustrating the point error in CDL-C channels, using MUSIC and LS algorithm.
Figure 12:
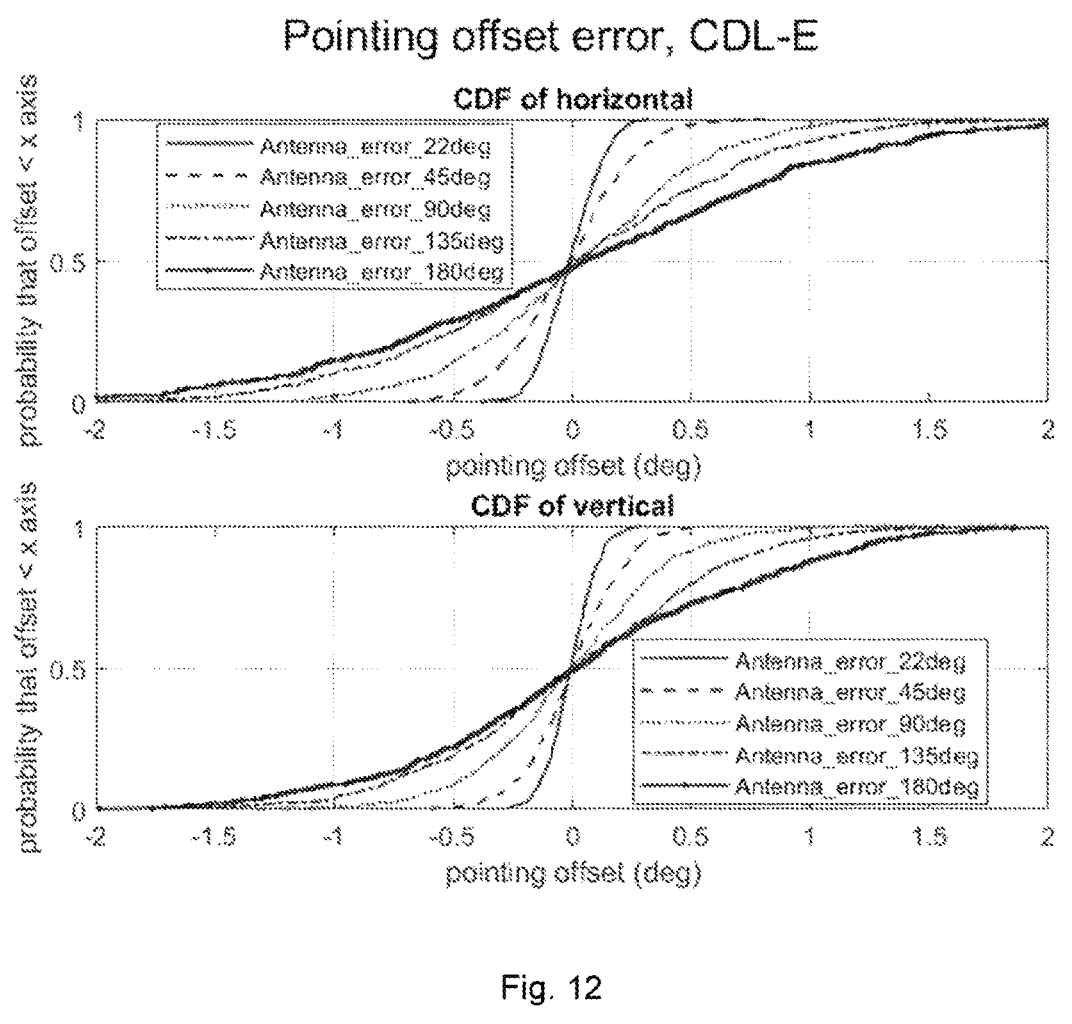

FIG. 10, FIG. 11, and FIG. 12 depict the pointing error of MUSIC plus LS method in AWGN, CDL-C and CDL-E channels, respectively. Compared with FIG. 5, FIG. 6, and FIG. 7, the distributions of the pointing errors in two algorithms are similar.

According to an embodiment, the method further comprises when the receiver is a network node 130 and the transmitter is user equipment, UE 140, 142, a plurality of channel data is obtained 302 based on a plurality of reference signals sent separately from a plurality of UEs 140, 142, or a plurality of reference signals sent separately from a plurality of UE antennas, or a plurality of reference signals sent from one UE 140 at different times. The method further comprises when the receiver is a UE 140 and the transmitter is a network node 130, a plurality of channel data is obtained 302 based on a plurality of reference signals sent by the network node 130 at different times, or a plurality of reference signals sent separately from a plurality of network node 130 antennas. The method further comprises the determining 306 of the direction and the mitigating 308 of $H_{OTA}$ are performed separately for each channel data of the plurality of channel data, so that a plurality of individual estimation of separate $H_{RX}$ are provided 310. The method further comprises averaging the plurality of separate $H_{RX}$.

Figure 13:
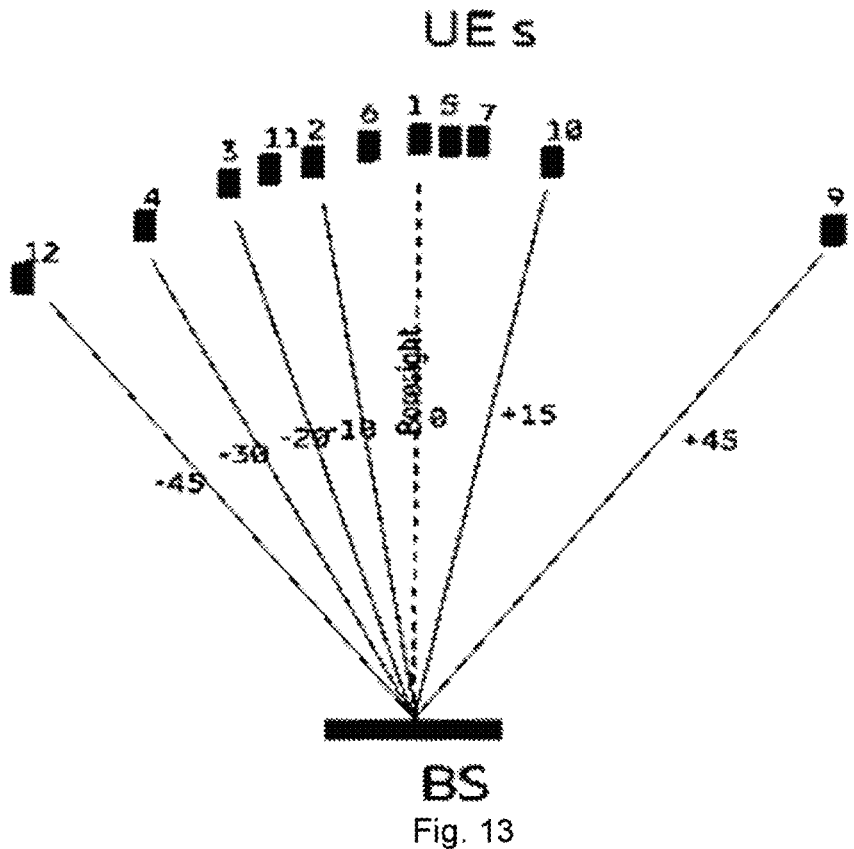
FIG. 13 is a schematic block diagram illustrating multiple UE communicating with a network node.

Referring to FIG. 13, when the receiver is a network node, e.g., a base station, it can receive a plurality of reference signals from a plurality of UEs 1, 2, 3 . . . 12 at different positions. The $H_{RX}$ is calculated separately by each UE.

Figure 14:
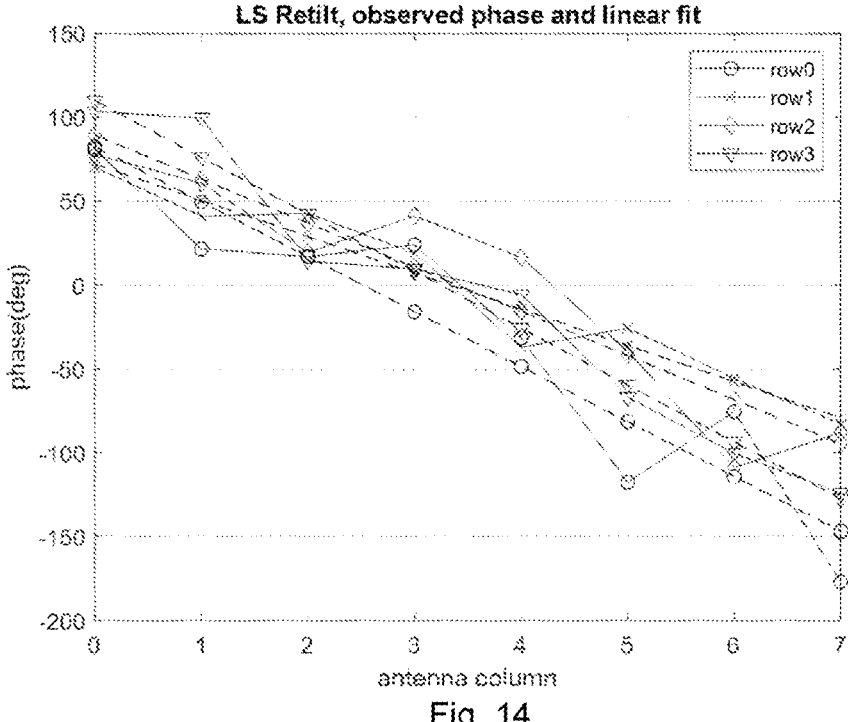
FIG. 14 is an x/y-diagram illustrating received phase response due to radio hardware and fading channels.

Referring to FIG. 14, the signal propagating through $H_{OTA}$ is also affected by the multipath fading. In general, the propagation channel contains zero or one LOS path and many NLOS paths. Due to the unpredictable environments, different paths may have different delays and different angles. The impairment of multipath fading is generally caused by the NLOS paths.

FIG. 14 depicts the phase response for array elements with LOS channel and NLOS channels. The antenna array is 4×8 URA, with 4 horizontal rows and 8 vertical columns. Ideally, the incoming signal from LOS channel may impose linear phase offset between antennas. Nevertheless, the incoming signal from NLOS channels may impose random phase offset between antennas. In FIG. 14, solid lines represent the phase derived from the channel data, while the dash lines represent the result after linear regression. Estimation error exists due to the impact of NLOS channels. Therefore, to achieve good accuracy, the impact of the NLOS channels need to be eliminated.

The impact of NLOS channels is eliminated by averaging the plurality of provided $H_{RX}$ based on multiple UEs in FIG. 13. Before averaging the plurality of $H_{RX}$, the quality of each $H_{RX}$ needs to be checked in step 314. It is common that sometimes the quality of the provided $H_{RX}$ may not be good enough. The plurality of provided $H_{RX}$ can be checked by Normalized mean squared error (NMSE) method. Lower NMSE indicates lower residual AC error. The $H_{RX}$ is selected for the further processing, e.g., averaging, only if its NMSE is lower than a predefined threshold. Otherwise, the $H_{RX}$ can be discarded.

As noted in FIG. 13, multiple transmitters, e.g., multiple UEs are used. The process of averaging is explained in following paragraphs.

In general, the plurality of channel data from UE n at subcarrier k can be rewritten as $$\begin{bmatrix} H_{1,n}(k) \\ H_{2,n}(k) \\ \vdots \\ H_{M,n}(k) \end{bmatrix} = \begin{bmatrix} c_1(k) \sum_{l=0}^{L-1} g_{m,n,l}(k) \\ c_2(k) \sum_{l=0}^{L-1} g_{m,n,l}(k) \\ \vdots \\ c_M(k) \sum_{l=0}^{L-1} g_{m,n,l}(k) \end{bmatrix}$$

where $c_m(k)$ denotes the initial AC error of the BS on antenna m, which is common for all incoming signals. $g_{m,n,l}(k)$ is the channel response of path l at subcarrier k between UE n and BS antenna m. Accordingly, $g_{m,n,l}(k)$ can be given by $$g_{m,n,l}(k) = a_{m,n,l} e^{j2\pi((f_c + k\Delta f)\tau_{m,n,l} + \theta_{m,n,l})}$$

For simplification, the index (k) is omitted in the following paragraphs.

In order to separate LOS from other NLOS, the channel data can be expressed as below. Without loss of generality, we denote l=0 as the LOS path while the others, l>0, are NLOS paths. Below is the channel response of a single UE. With the method of DOA estimation e.g., MUSIC as noted above, the position of LOS path in both azimuth and elevation can be found.

$$\begin{bmatrix} H_{1,n} \\ H_{2,n} \\ \vdots \\ H_{M,n} \end{bmatrix} = \begin{bmatrix} c_1 g_{1,n,0} \\ c_2 g_{2,n,0} \\ \vdots \\ c_N g_{M,n,0} \end{bmatrix} + \begin{bmatrix} c_1 \sum_{l=1}^{L-1} g_{1,n,l} \\ c_2 \sum_{l=1}^{L-1} g_{2,n,l} \\ \vdots \\ c_N \sum_{l=1}^{L-1} g_{M,n,l} \end{bmatrix}$$

All UEs need to be aligned to the same direction, such as boresight line. Otherwise, combination of multiple UEs will show the similar result as single UE. According to the position of LOS path of each UE, a channel response is constructed with ideal pure LOS path $\check{g}$. Then the channel data is rotated to the boresight line, i.e.

$$
\begin{bmatrix} \check{g}_{1,n,0}^* H_{1,n} \\ \check{g}_{2,n,0}^* H_{2,n} \\ \vdots \\ \check{g}_{M,n,0}^* H_{M,n} \end{bmatrix} \approx \begin{bmatrix} c_1 |g_{1,n,0}|^2 \\ c_2 |g_{2,n,0}|^2 \\ \vdots \\ c_M |g_{M,n,0}|^2 \end{bmatrix} + \begin{bmatrix} c_1 \sum_{l=1}^{L-1} \check{g}_{1,n,0}^* g_{1,n,l} \\ c_2 \sum_{l=1}^{L-1} \check{g}_{2,n,0}^* g_{2,n,l} \\ \vdots \\ c_M \sum_{l=1}^{L-1} \check{g}_{M,n,0}^* g_{M,n,l} \end{bmatrix}
$$

For multiple UEs, all results are summed up as below. The initial AC error c is estimated because c is common to all the UE, while NLOS channel responses are random.

$$
\begin{bmatrix} \tilde{c}_1 \\ \tilde{c}_2 \\ \vdots \\ \tilde{c}_M \end{bmatrix} = \begin{bmatrix} \sum_{n=1}^{N} \check{g}_{1,n,0}^* H_{1,n} \\ \sum_{n=1}^{N} \check{g}_{2,n,0}^* H_{2,n} \\ \vdots \\ \sum_{n=1}^{N} \check{g}_{M,n,0}^* H_{M,n} \end{bmatrix} \approx \begin{bmatrix} c_1 \sum_{n=1}^{N} |g_{1,n,0}|^2 \\ c_2 \sum_{n=1}^{N} |g_{2,n,0}|^2 \\ \vdots \\ c_M \sum_{n=1}^{N} |g_{M,n,0}|^2 \end{bmatrix} + \begin{bmatrix} c_1 \sum_{n}^{N} \sum_{l=1}^{L-1} \check{g}_{1,n,0}^* g_{1,n,l} \\ c_2 \sum_{n}^{N} \sum_{l=1}^{L-1} \check{g}_{2,n,0}^* g_{2,n,l} \\ \vdots \\ c_M \sum_{n}^{N} \sum_{l=1}^{L-1} \check{g}_{M,n,0}^* g_{1,n,l} \end{bmatrix}
$$

As N→∞, the result converges to $$
\begin{bmatrix} \tilde{c}_1 \\ \tilde{c}_2 \\ \vdots \\ \tilde{c}_M \end{bmatrix} = \begin{bmatrix} c_1 \\ c_2 \\ \vdots \\ c_M \end{bmatrix} + \frac{1}{N} \begin{bmatrix} c_1 \sum_{n=1}^{N} \sum_{l=1}^{L-1} \check{g}_{1,n,0}^* g_{1,n,l} \\ c_2 \sum_{n=1}^{N} \sum_{l=1}^{L-1} \check{g}_{2,n,0}^* g_{2,n,l} \\ \vdots \\ c_M \sum_{n=1}^{N} \sum_{l=1}^{L-1} \check{g}_{M,n,0}^* g_{M,n,l} \end{bmatrix}
$$

The second term in the right part of above equation denotes the NLOS impairment, and it vanishes as N approaching ∞. As a result, the impact of the NLOS is eliminated. When the plurality of channel data is averaged, a more accurate estimation of the AC error is achieved.

Figure 15:
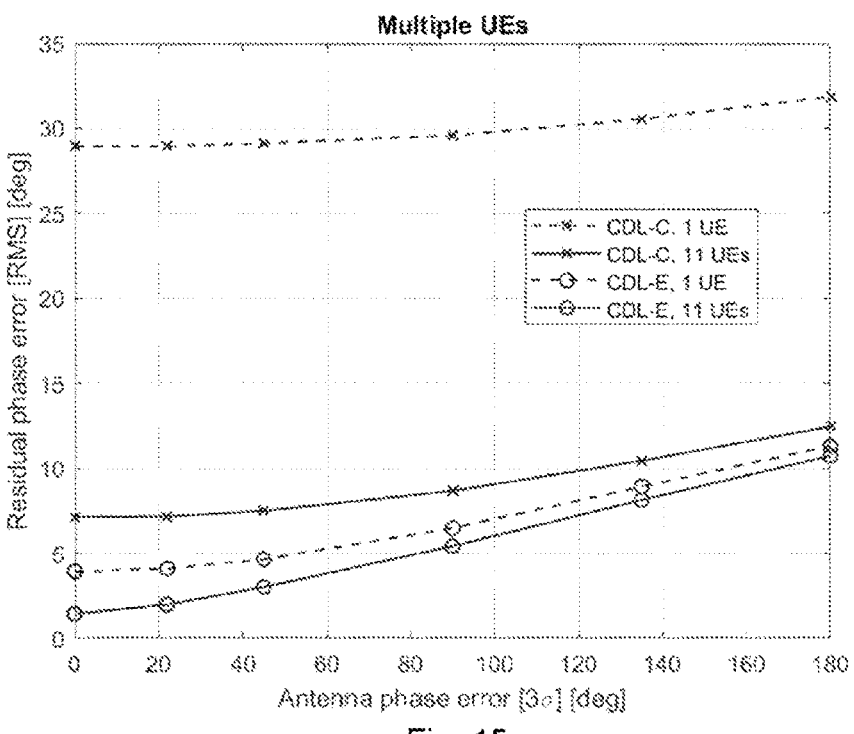
FIG. 15 is an x/y-diagram illustrating the resulting AC error based on single UE and multiple UEs in CDL-D and CDL-E channels.

FIG. 15 shows the results in the simulation of CDL-C and CDL-E to compare single UE and multiple UEs. These two channel models are chosen because they are representative cases. For example, CDL-C has no LOS, but CDL-E has strong LOS. If the channel doesn't have LOS, the strongest NLOS is treated as LOS. It is seen that in CDL-C with single UE, the result is very poor. Meanwhile, in CDL-E, since LOS is strong, the result is much better. By averaging the results from multiple UEs, significant improvement can be seen, especially in CDL-C.

Similarly, the residual actually contains two parts: residual AC error and pointing error. The residual AC error can deteriorate the directivity of beam, therefore it is crucial to the system performance. The pointing error can lead to an offset in the beam. The impact of pointing error is marginal compared to the impact of residual AC error.

Figure 16:
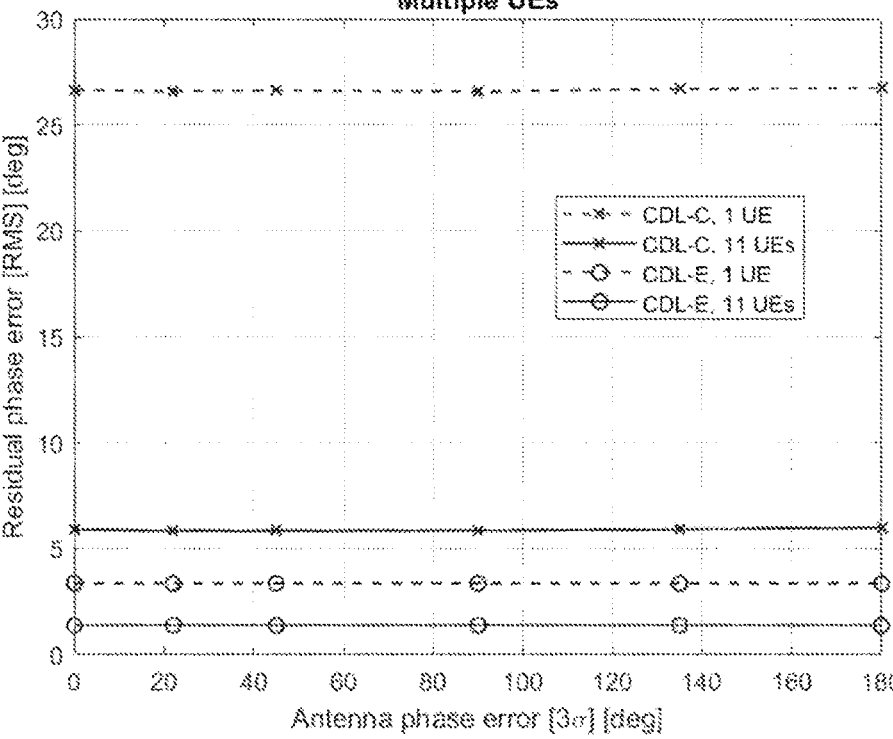
FIG. 16 is an x/y-diagram illustrating the resulting AC error based on single UE and multiple UEs in CDL-D and CDL-E channels, without pointing error.

FIG. 16 shows the result of FIG. 15 without the pointing error. It is seen that the residual AC error is irrelevant to the initial AC error. That means the embodiment can achieve the same result for any initial AC error.

Figure 17:
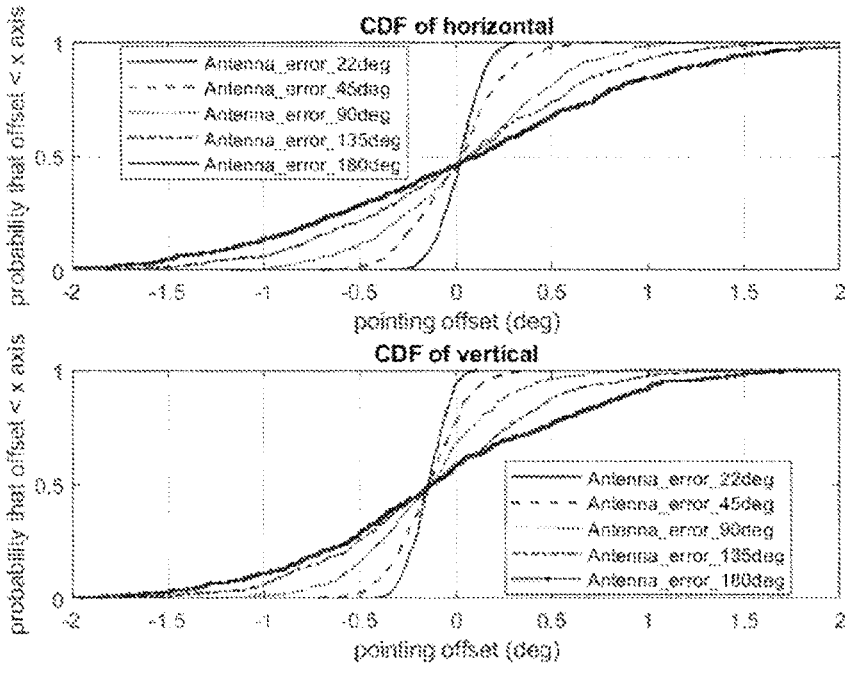
FIG. 17 is an x/y-diagram illustrating the pointing error from multiple UEs in CDL-C channels.
Figure 18:
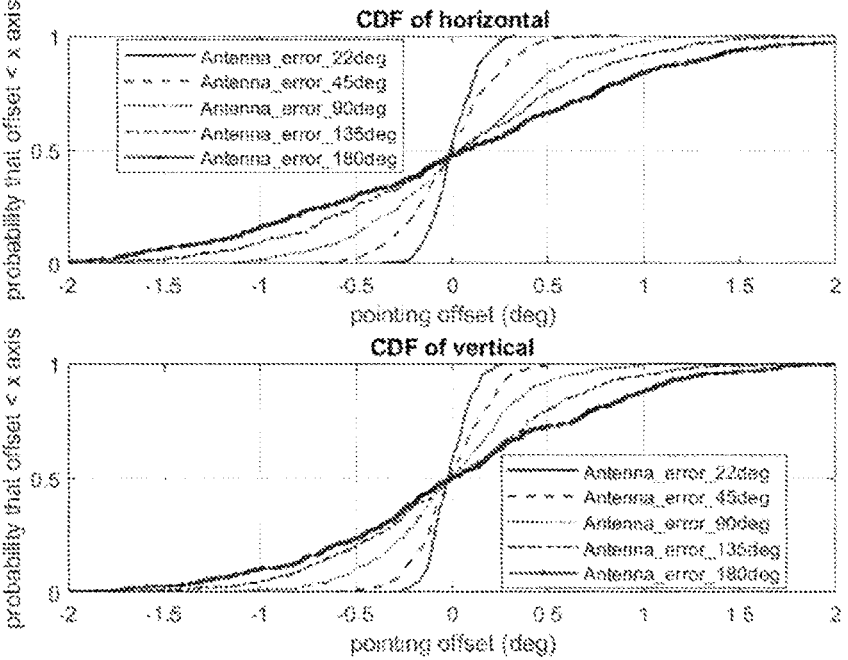
FIG. 18 is an x/y-diagram illustrating the pointing error from multiple UEs in CDL-E channels.

FIG. 17 and FIG. 18 show the pointing error in the result of FIG. 14 in CDL-C and CDL-E respectively. As the initial AC error increases, the pointing error increases as well. This is because the accuracy of DOA estimation depends on the initial AC error. Typically, the pointing error can be kept within +/−2 degree.

Besides the scenario shown in FIG. 13, when the receiver is a network node and the transmitter is UE, the network node can receive a plurality of reference signals respectively from a plurality of UEs, it can also receive a plurality of reference signals from a plurality of UE antennas, or from one UE at different times. A plurality of channel data is obtained based on the plurality of reference signals. The determination and averaging step are similarly performed.

When the receiver is a UE and the transmitter is a network node, the UE can receive a plurality of reference signals sent by the network node at different times, or receive a plurality of reference signals sent separately from a plurality of network node antennas. The determination and averaging step are similarly performed.

By such method, the impact of NLOS channels is removed due to their randomness. A more accurate estimation of the AC error is achieved.

According to another embodiment, the method further comprises indicating 316 the provided 310 $H_{RX}$ thereby enabling a compensation of the antenna calibration error in subsequent signals received from the transmitter.

Referring to FIG. 1, FIG. 3-FIG. 18, a method performed by a transmitter of a wireless communication network 100 is also disclosed. The method is used for estimating antenna calibration error in the transmitter. The transmitter comprises a plurality of radio antennas arranged in a known geometrical configuration, the plurality of radio antennas being able to transmit one or more reference signals to a receiver. The method comprises obtaining 302 channel data of a communication channel between the transmitter and the receiver based on the channel data feedback wirelessly by the receiver to the transmitter. The channel data feedback by the receiver is based on one or more reference signals sent from the transmitter to the receiver. The obtained 302 channel data comprising $H_{OTA}$ and $H_{TX}$, $H_{OTA}$ being the channel data contributed by a wireless propagation path between the transmitter and the receiver, $H_{TX}$ being the channel data contributed by the antenna calibration error of the transmitter. The method further comprises determining 306 a direction between the receiver and the transmitter in relation to the known geometrical configuration arrangement of the plurality of radio antennas of the transmitter, based on the obtained 302 channel data, the determined 306 direction indicating $H_{OTA}$. The method further comprises mitigating 308 the $H_{OTA}$ from the obtained 302 channel data by the determined 306 direction. The method further comprises providing 310 the $H_{TX}$ part of the obtained 302 channel data after the $H_{OTA}$ being mitigated 308, the $H_{TX}$ indicating the antenna calibration error in the form of channel data.

The method of the transmitter in this embodiment is similar to the method of the receiver. The only difference is that the transmitter obtains 302 the channel data based on the channel data feedback by the receiver. The channel data feedback by the receiver is based on the one or more reference signal sent from the transmitter to the receiver.

According to another embodiment, method further comprises calculating 304 a channel covariance matrix based on the obtained 302 channel data. The step of determining 306 a direction between the receiver and the transmitter further comprises determining 306 the direction, based on the calculated 304 channel covariance matrix by using a subspace method on the channel covariance matrix, the determined 306 direction having the maximum value in pseudo angular spectrum.

According to another embodiment, the method further comprises refining 312 the determined 306 direction by linear regression of the obtained 302 channel data in phase domain.

According to another embodiment, the method further comprises when the transmitter is a network node 130 and the receiver is user equipment, UE 140, 142, a plurality of channel data is obtained 302 based on a plurality of channel data feedback separately by a plurality of UE 140, 142, or a plurality channel data feedback separately by a plurality of UE antennas, or a plurality of channel data feedback separately by one UE 140 at different times. The method further comprises when the transmitter is UE 140 and the receiver is a network node 130, a plurality of channel data is obtained 302 based on a plurality of channel data feedback separately by the network node 130 at different times, or a plurality of channel data feedback separately from a plurality of network node 130 antennas. The method further comprises the determining 306 of the direction and the mitigating 308 of $H_{OTA}$ are performed separately for each channel data, so that a plurality of separate $H_{TX}$ is provided 310 or modified 312. The method further comprises checking 314 the quality of each of the provided 310 $H_{TX}$ and averaging the plurality of separate $H_{TX}$.

According to another embodiment, the method further comprises indicating 316 the provided 310 $H_{TX}$ thereby enabling a compensation of the antenna calibration error in subsequent signals transmitted from the transmitter.

According to another embodiment, a receiver operable in a wireless communication network 100 and configured for estimating antenna calibration error in the receiver is also provided. The receiver comprising a plurality of radio antennas arranged in a known geometrical configuration. The receiver comprising a processing circuitry 603 and a memory 604, said memory 603 containing instructions executable by said processing circuitry 603. The receiver is operative for obtaining channel data of a communication channel between a transmitter and the receiver based on one or more Reference Signals, RS, sent wirelessly between the transmitter and the plurality of antennas of the receiver, the obtained channel data comprising $H_{OTA}$ and $H_{RX}$, $H_{OTA}$ being the channel data contributed by a wireless propagation path between the transmitter and the receiver, $H_{RX}$ being the channel data contributed by the antenna calibration error of the receiver. The receiver is further operative for determining a direction between the transmitter and the receiver in relation to the known geometrical configuration arrangement of the plurality of radio antennas of the receiver, based on the obtained channel data, the determined direction indicating the $H_{OTA}$. The receiver is further operative for mitigating the $H_{OTA}$ from the obtained channel data based on the determined direction and providing the $H_{RX}$ part of the obtained channel data after the $H_{OTA}$ being mitigated.

According to another embodiment, the receiver is further operative for calculating a channel covariance matrix based on the obtained channel data. The step of determining a direction between the transmitter and the receiver further comprises determining the direction, based on the calculated channel covariance matrix by using a subspace method on the channel covariance matrix, the determined direction having the maximum value in pseudo angular spectrum.

According to another embodiment, the receiver is further operative for refining the direction at the receiver by linear regression of the obtained channel data in phase domain.

According to another embodiment, wherein the receiver is a network node 130 and the transmitter is a user equipment, UE 140, 142, the obtaining comprising obtaining a plurality of channel data based on a plurality of RS sent separately from a plurality of UEs 140, 142, or a plurality of RS sent separately from a plurality of UE antennas, or a plurality of RS sent from one UE 140 at different times, or wherein the receiver is a UE 140 and the transmitter is a network node 130, the obtaining comprising obtaining a plurality of channel data based on a plurality of RS sent by the network node 130 at different times, or a plurality of RS sent separately from a plurality of network node 130 antennas; wherein the determining of the direction and the mitigating of $H_{OTA}$ are performed separately for each channel data of the plurality of channel data, so that a plurality of individual estimation of separate $H_{RX}$ are provided. The receiver is further operative for checking the quality of each of the provided $H_{RX}$ and averaging the plurality of separate $H_{RX}$.

According to another embodiment, the receiver is further operative for indicating the provided $H_{RX}$, thereby enabling a compensation of the antenna calibration error in subsequent signals received from the transmitter.

FIG. 18 describes a receiver operable in a wireless communication network 100 and configured for receiving wireless signals from a transmitter. The receiver may comprise multiple antennas. The receiver may further comprise a communication unit 602, which may be considered to comprise conventional means for wireless communication with the transmitter, such as a receiving unit for wireless reception of signals. The instructions executable by said processing circuitry 603 may be arranged as a computer program 605 stored e.g., in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry 603, they cause the receiver to perform the steps described in any of the described embodiments of the receiver and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the receiver has access via the communication unit 602. The computer program 605 may then be downloaded from the server into the memory 604.

According to another embodiment, a transmitter operable in a wireless communication network 100 and configured for estimating antenna calibration error in the transmitter is provided. The transmitter comprises a plurality of radio antennas arranged in a known geometrical configuration, the transmitter comprising a processing circuitry 703 and a memory 704, said memory 703 containing instructions executable by said processing circuitry 703. The transmitter is operative for obtaining channel data of a communication channel between the transmitter and a receiver based on the channel data feedback wirelessly by the receiver to the transmitter, the channel data feedback by the receiver being based on one or more Reference Signals, RS, sent from the transmitter to the receiver, the obtained channel data comprising $H_{OTA}$ and $H_{TX}$, $H_{OTA}$ being the channel data contributed by a wireless propagation path between the transmitter and the receiver, $H_{TX}$ being the channel data contributed by the antenna calibration error of the transmitter. The transmitter is further operative for determining a direction between the receiver and the transmitter in relation to the known geometrical configuration arrangement of the plurality of radio antennas of the transmitter, based on the obtained channel data, the determined direction indicating $H_{OTA}$. The transmitter is further operative for mitigating the $H_{OTA}$ from the obtained channel data by the determined direction and providing the $H_{TX}$ part of the obtained channel data after the $H_{OTA}$ being mitigated.

According to another embodiment, the transmitter is further operative for: calculating a channel covariance matrix based on the obtained channel data. The step of determining a direction between the receiver and the transmitter further comprises determining the direction, based on the calculated channel covariance matrix by using a subspace method on the channel covariance matrix, the determined direction having the maximum value in pseudo angular spectrum.

According to another embodiment, the transmitter is further operative for refining the direction by linear regression of the obtained channel data in phase domain.

According to another embodiment, wherein the transmitter is a network node 130 and the receiver is a user equipment, UE 140, 142. The obtaining comprising obtaining a plurality of channel data is based on a plurality of channel data feedback separately by a plurality of UE 140, 142, or a plurality of channel data feedback separately by a plurality of UE antennas, or a plurality of channel data feedback separately by one UE 140 at different times. Wherein the transmitter is a UE 140 and the receiver is a network node 130, the obtaining comprising obtaining a plurality of channel data based on a plurality of channel data feedback separately by the network node 130 at different times, or a plurality of channel data feedback separately from a plurality of network node 130 antennas. The determining of the direction and the mitigating of $H_{OTA}$ are performed separately for each channel data of the plurality of channel data, so that a plurality of individual estimation of separate $H_{TX}$ is provided. The transmitter is further operative for checking the quality of each of the provided $H_{TX}$ and averaging the plurality of separate $H_{TX}$.

According to another embodiment, the transmitter is further operative for indicating the provided $H_{TX}$ thereby enabling a compensation of the antenna calibration error in subsequent signals transmitted from the transmitter.

Figure 19:
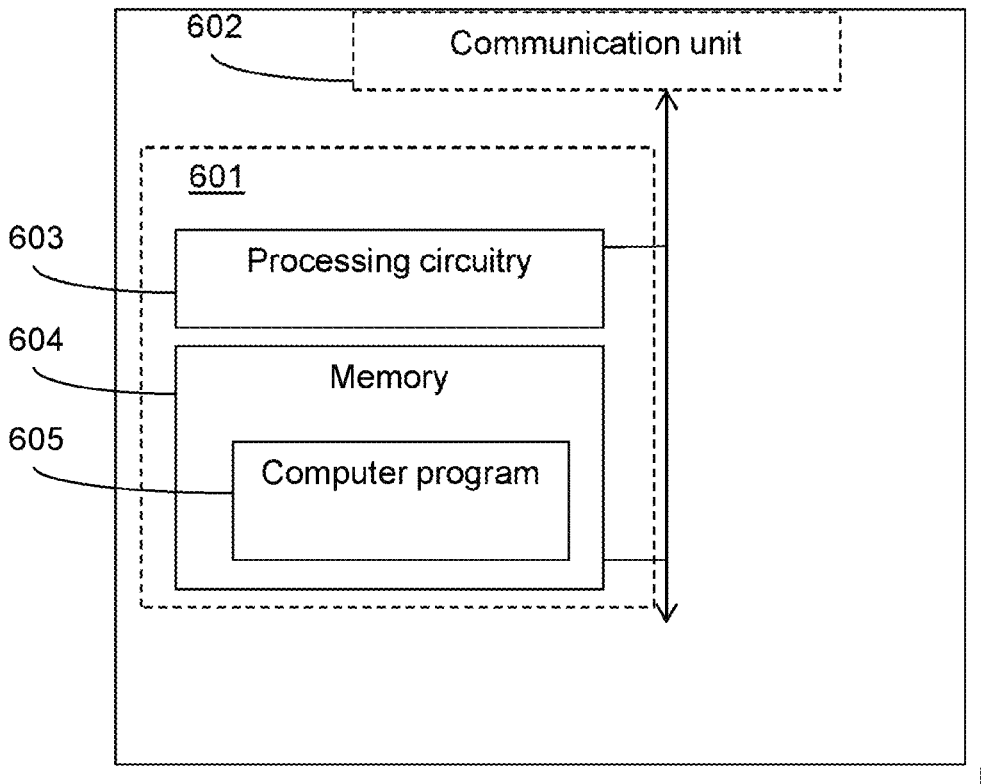
FIG. 19 is a block diagram illustrating the receiver in more detail, according to further possible embodiments.
Figure 20:
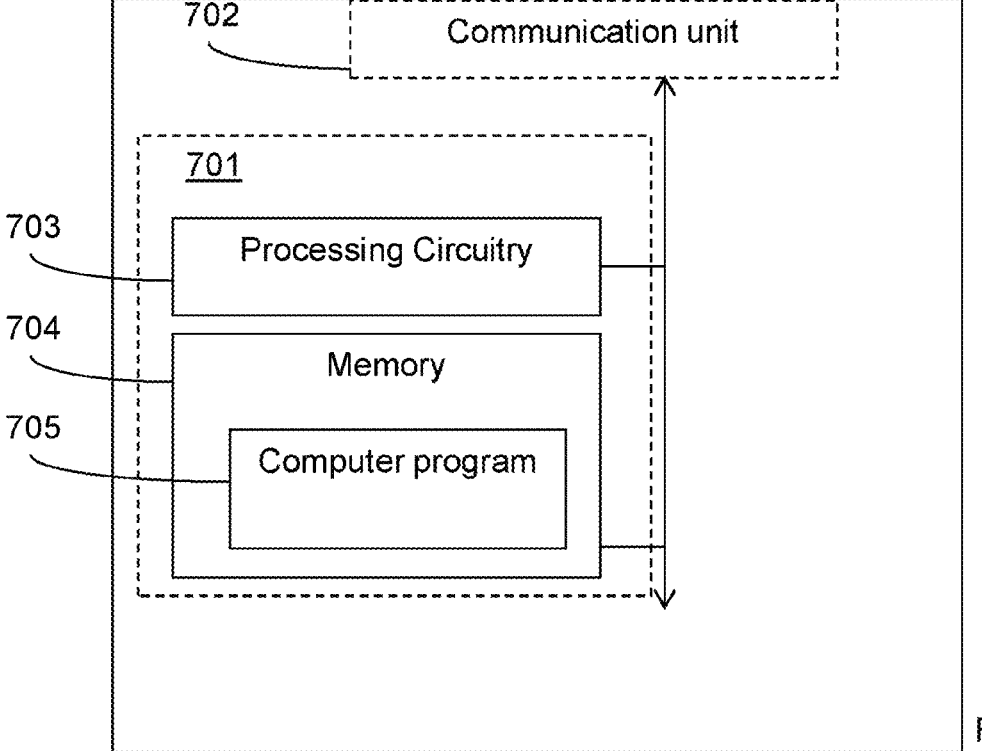
FIG. 20 is a block diagram illustrating the transmitter in more detail, according to further possible embodiments.

FIG. 19 describes a wireless transmitter operable in a wireless communication network 100 and configured for transmitting wireless signals to a receiver comprising multiple antennas. The transmitter comprises multiple antennas. The transmitter may further comprise a communication unit 702, which may be considered to comprise conventional means for wireless communication with the receiver, such as a transceiver for wireless transmission and reception of signals. The instructions executable by said processing circuitry 703 may be arranged as a computer program 705 stored e.g., in said memory 704. The processing circuitry 703 and the memory 704 may be arranged in a sub-arrangement 701. The sub-arrangement 701 may be a microprocessor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause transmitter to perform the steps described in any of the described embodiments of the transmitter and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 704. Alternatively, the computer program may be stored on a server or any other entity to which transmitter has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a receiver of a wireless communication network, for estimating antenna calibration error in the receiver, the receiver comprising a plurality of radio antennas arranged in a known geometrical configuration, the method comprising:

obtaining channel data of a communication channel between a transmitter and the receiver based on one or more Reference Signals, RS, sent wirelessly between the transmitter and the plurality of antennas of the receiver, the obtained channel data comprising $H_{OTA}$ and $H_{RX}$, $H_{OTA}$ being the channel data contributed by a wireless propagation path between the transmitter and the receiver, $H_{RX}$ being the channel data contributed by the antenna calibration error of the receiver;

determining a direction between the transmitter and the receiver in relation to the known geometrical configuration arrangement of the plurality of radio antennas of the receiver, based on the obtained channel data, by applying a subspace method;

wherein the determined direction is indicating the $H_{OTA}$;

mitigating the $H_{OTA}$ from the obtained channel data based on the determined direction by rotating the direction between the transmitter and the receiver to a common direction;

providing the $H_{RX}$ part of the obtained channel data after the $H_{OTA}$ being mitigated.

2. The method as claimed in claim 1, method further comprises:

calculating a channel covariance matrix based on the obtained channel data;

the step of determining a direction between the transmitter and the receiver further comprises: determining the direction, based on the calculated channel covariance matrix by using a subspace method on the channel covariance matrix, the determined direction having the maximum value in pseudo angular spectrum.

3. The method of claim 1, the method further comprises:

refining the determined direction by linear regression of the obtained channel data in phase domain.

4. The method of claim 1, wherein the receiver is a network node and the transmitter is a user equipment, UE, the obtaining comprising obtaining a plurality of channel data based on a plurality of RS sent separately from a plurality of UEs, or a plurality of RS sent separately from a plurality of UE antennas, or a plurality of RS sent from one UE at different times, or wherein the receiver is a UE and the transmitter is a network node, the obtaining comprising obtaining a plurality of channel data based on a plurality of RS sent by the network node at different times, or a plurality of RS sent separately from a plurality of network node antennas;

and wherein the determining of the direction and the mitigating of $H_{OTA}$ are performed separately for each channel data of the plurality of channel data, so that a plurality of individual estimation of separate $H_{RX}$ are provided, the method further comprises:

checking the quality of each of the provided $H_{RX}$;

averaging the plurality of separate $H_{RX}$.

5. The method of claim 1, the method further comprises:

indicating the provided $H_{RX}$, thereby enabling a compensation of the antenna calibration error in subsequent signals received from the transmitter.

6. A non-transitory computer program product comprising a computer program comprising instructions, which, when executed by at least one processing circuitry causes the processing circuitry to perform actions according to claim 1.

7. A method performed by a transmitter of a wireless communication network, for estimating antenna calibration error in the transmitter, the transmitter comprising a plurality of radio antennas arranged in a known geometrical configuration, the method comprising:

obtaining channel data of a communication channel between the transmitter and a receiver based on channel data fed back wirelessly by the receiver to the transmitter, the channel data feedback by the receiver being based on one or more Reference Signals, RS, sent from the transmitter to the receiver, the obtained channel data comprising $H_{OTA}$ and $H_{TX}$, $H_{OTA}$ being the channel data contributed by a wireless propagation path between the transmitter and the receiver, $H_{TX}$ being the channel data contributed by the antenna calibration error of the transmitter;

determining a direction between the receiver and the transmitter in relation to the known geometrical configuration arrangement of the plurality of radio antennas of the transmitter, based on the obtained channel data, by applying a subspace method;

wherein the determined direction is indicating $H_{OTA}$;

mitigating the $H_{OTA}$ from the obtained channel data by the determined direction by rotating the direction between the transmitter and the receiver to a common direction;

providing the $H_{TX}$ part of the obtained channel data after the $H_{OTA}$ being mitigated.

8. The method as claimed in claim 7, method further comprises:

calculating a channel covariance matrix based on the obtained channel data;

the step of determining a direction between the receiver and the transmitter further comprises:

determining the direction, based on the calculated channel covariance matrix by using a subspace method on the channel covariance matrix, the determined direction having the maximum value in pseudo angular spectrum.

9. The method of claim 7, the method further comprises:

refining the determined direction by linear regression of the obtained channel data in phase domain.

10. The method of claim 7, wherein the transmitter is a network node and the receiver is a user equipment, UE, the obtaining comprising obtaining a plurality of channel data based on a plurality of channel data fed back separately by a plurality of UE, or a plurality channel data fed back separately by a plurality of UE antennas, or a plurality of channel data fed back separately by one UE at different times, or wherein the transmitter is a UE and the receiver is a network node, the obtaining comprising obtaining a plurality of channel data based on a plurality of channel data fed back separately by the network node at different times, or a plurality of channel data fed back separately from a plurality of network node antennas;

and wherein the determining of the direction and the mitigating of $H_{OTA}$ are performed separately for each channel data of the plurality of channel data, so that a plurality of individual estimation of separate $H_{TX}$ is provided, the method further comprises:

checking the quality of each of the provided $H_{TX}$;

averaging the plurality of separate $H_{TX}$.

11. The method of claim 7, the method further comprises: indicating the provided $H_{TX}$ thereby enabling a compensation of the antenna calibration error in subsequent signals transmitted from the transmitter.

12. A receiver operable in a wireless communication network and configured for estimating antenna calibration error in the receiver, the receiver comprising a plurality of radio antennas arranged in a known geometrical configuration, the receiver comprising a processing circuitry and a memory, said memory containing instructions executable by said processing circuitry, whereby receiver is operative for:

obtaining channel data of a communication channel between a transmitter and the receiver based on one or more Reference Signals, RS, sent wirelessly between the transmitter and the plurality of antennas of the receiver, the obtained channel data comprising $H_{OTA}$ and $H_{RX}$, $H_{OTA}$ being the channel data contributed by a wireless propagation path between the transmitter and the receiver, $H_{RX}$ being the channel data contributed by the antenna calibration error of the receiver;

determining a direction between the transmitter and the receiver in relation to the known geometrical configuration arrangement of the plurality of radio antennas of the receiver, based on the obtained channel data, by applying a subspace method;

wherein the determined direction is indicating the $H_{OTA}$;

mitigating the $H_{OTA}$ from the obtained channel data based on the determined direction by rotating the direction between the transmitter and the receiver to a common direction;

providing the $H_{RX}$ part of the obtained channel data after the $H_{OTA}$ being mitigated.

13. A transmitter operable in a wireless communication network and configured for estimating antenna calibration error in the transmitter, the transmitter comprising a plurality of radio antennas arranged in a known geometrical configuration, the transmitter comprising a processing circuitry and a memory, said memory containing instructions executable by said processing circuitry, whereby transmitter is operative for:

obtaining channel data of a communication channel between the transmitter and a receiver based on channel data fed back wirelessly by the receiver to the transmitter, the channel data feedback by the receiver being based on one or more Reference Signals, RS, sent from the transmitter to the receiver, the obtained channel data comprising $H_{OTA}$ and $H_{TX}$, $H_{OTA}$ being the channel data contributed by a wireless propagation path between the transmitter and the receiver, $H_{TX}$ being the channel data contributed by the antenna calibration error of the transmitter;

determining a direction between the receiver and the transmitter in relation to the known geometrical configuration arrangement of the plurality of radio antennas of the transmitter, based on the obtained channel data, by applying a subspace method;

wherein the determined direction is indicating $H_{OTA}$;

mitigating the $H_{OTA}$ from the obtained channel data by the determined direction by rotating the direction between the transmitter and the receiver to a common direction;

providing the $H_{TX}$ part of the obtained channel data after the $H_{OTA}$ being mitigated.

* * * * *